Patented July 29, 1947

2,424,814

UNITED STATES PATENT OFFICE 2,424,814

CONJOINT POLYMERIZATION PRODUCT OF DICARBOXYLIC COMPOUNDS AND VINYLIC COMPOUNDS

Howard L. Gerhart, Milwaukee, Wis., assignor to Pittsburgh Plate Glass Company, Allegheny County, Pa., a corporation of Pennsylvania No Drawing. Original application August 15, 1941, Serial No. 407,010, now Patent No. 2,392,139, dated January 1, 1946. Divided and this application March 30, 1944, Serial No. 528,730

2 Claims. (Cl. 260—36)

The present invention relates to artificial resins and it has particular relation to such resins as are obtained by reacting substituted or unsubstituted ethylene $\alpha\beta$ dicarboxylic acids or anhydrides thereof with a polymerizable olefin.

One object of the invention is to provide a clear, hard, tough, stable and well plasticized resin of the above type which is relatively free from bubbles or cavities.

A second object of the invention is to provide a resinifying fluid material that can be cast, or can be employed as an investment median and formed into clear, hard, durable and tough bodies at low temperatures and with but little distortion.

These and other objects will be apparent from consideration of the following specification and the appended claims.

It has heretofore been proposed to heat an unsaturated dicarboxylic acid, such as maleic acid or its anhydride and a polymerizable olefin such as styrene to obtain polymerization products of white powdery character, which are soluble in acetone and dilute alkalies.

My copending application Serial No. 242,127, filed November 23, 1938, now issued as Patent No. 2,297,351 as of the date of Sept. 29, 1942, is based upon the discovery that unsaturated dicarboxylic acids of the type of maleic acid, or maleic anhydride, or fumaric acid, or substituted maleic or fumaric acid and polymerizable olefins of the type of styrene will under the influence of actinic radiation react to form clear and hard resins which are relatively insoluble and substantially free of voids. These resins are well adapted for molding, cutting, pressing, or otherwise forming into bodies of great beauty. The resin-forming reaction may be carried out completely or at least in its final stages by casting the reacting mass in a suitable mold, thus obtaining directly the finally desired object.

However, considerable difficulty has been experienced in adequate plasticization of the resin in order to obtain clear, hard and tough bodies, that maintain that condition over long periods of time. Very few plasticizers are adequately compatible to admit of satisfactory use and those that are compatible usually are too volatile to admit of permanent plasticization.

The present invention is based upon the discovery that carbonyl compounds which include within their structure the group

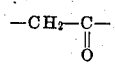

are quite generally of particular value as plasticizers for resins of the above-described type. The plasticizers may be either of open, chain or cyclic character, the type formulae of which are:

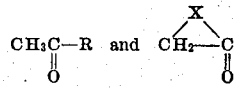

where R and X are organic radicals. Examples of the first-mentioned class of compounds include:

Diacetone alcohol

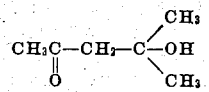

Acetophenone

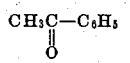

Derivatives of acetophenone containing groups such as methyl, nitro, amino and the like in meta and para or even ortho positions are contemplated.

Mesityl oxide

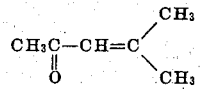

methyl and ethyl acetone, methyl ethyl ketone, etc., are useful.

Carbonyl compounds represented by the generic cyclic formula include:

Isophorone
Camphor
Cyclohexanone
Ortho and para methyl cyclohexanone and the like.

These plasticizers may be incorporated with the compounds undergoing resinification either before or after partial reaction and they may also be employed as solvents for the reactants.

The plasticizers may be employed as individuals or in admixture with each other or with other soluble compounds. The ratio of plasticizer may vary over a broad range, and may be as low as 10%, based upon the resin components, or as high as 50 or 60%. However, about 25 to 35% seems to be satisfactory.

The reaction to form the new compositions is typified by that between maleic acid or maleic acid anhydride and styrene. The two compounds, along with an appropriate plasticizer are simply admixed directly or are introduced into a solvent such as triacetin and are then caused to react by actinic irradiation at a temperature within the range of about 20 to 50° C. Irradiation of the reactants may be continued throughout the period of reaction, but it may be discontinued after the reaction has started. It is also possible to introduce a small amount (e. g. 1 to 10%) of preliminarily irradiated reactants into the main batch and thus to obviate further irradiation.

Reaction may also be initiated by application of heat and after it has progressed sufficiently far, heating is discontinued. If very hard products are desired the mass may be finally heat treated at a suitable temperature (e. g. 100–200° C.) until the desired stage is reached. The reaction can be brought to completion within an hour or less, but by reducing the degree or time of irradiation it is possible to extend it over a period of several days.

The reaction product obtained from maleic anhydride and styrene may be represented by the formula:

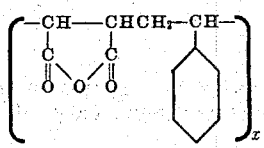

where $x$ represents the number of the foregoing groups in the molecule and is of variable value.

Since the reaction is general in character and applies to many unsaturated dicarboxylic acids or anhydrides; i. e., substituted maleic or fumaric acid and to many of the polymerizable olefins, the product may be represented by the type formula:

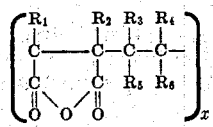

where the groups $R_1$ $R_2$ $R_3$ $R_4$ $R_5$ $R_6$ may be practically any of the possible substituent groups. Examples of a few of the possibilities include hydrogen and chlorine, carbonyl, carboxyl, alkyl, aromatic and the like groups. Examples of possible ethylene $\alpha\beta$ dicarboxylic acids or ethylenic dicarboxylic acids which are transformable to $\alpha\beta$ form, which may be employed, include maleic acid (above described), fumaric acid, the mono or di chloro substituted maleic and fumaric acids, alkylated maleic and fumaric acids, such as itaconic, citraconic acid, mesaconic acid, mono and di phenyl maleic acid, benzyl maleic, dibenzyl maleic, ethyl maleic, or any similar acids containing a double bond in the chain between the two carboxyl groups.

The number of polymerizable olefinic compounds is also very large and of general character. It includes styrene above described, vinyl acetate, vinyl chloride, methyl styrene, parahydroxy styrene, acrylic acid, methyl, ethyl, or other esters of acrylic acid, acrolein, unsaturated ketones, such as methyl vinyl ketone, indene, coumarone and the like.

Styrene, methyl styrene, indene and coumarone constitute polymerizable aralkene hydrocarbons.

It is to be understood that any one or more of the dicarboxylic acids can be combined with any one or more of the olefinic compounds, to provide resins in great variety. The ratio of the dicarboxylic acid to the olefinic compound is susceptible of wide variation, but for purposes of illustration may be considered as approximately molar.

Oxidizing agents such as benzoyl peroxide may be employed to speed up reaction of the resin-forming materials. Reducing agents, such as hydroquinone pyrogallol, tannic acid, etc., may be employed to retard reaction.

As previously stated, the resinous bodies are insoluble, but it is possible to cast incipiently polymerized masses into molds in which hardening to final form is effected. Polymerization in molds formed of soft glass, Pyrex, or other material transparent to actinic rays is contemplated. Likewise, it is possible to introduce reactive mixtures containing at least a portion of irradiated material into opaque molds of rubber or plaster and then to complete polymerization. It is also possible to heat the resins to the softening point and then to press them to shape.

A further application of the invention consists in providing a layer of polymerizable materials and plasticizer between two sheets of glass. By irradiating this glass, it is possible to form a film of transparent closely adherent resin between the glass sheets, thus forming a safety glass. The materials may be partially polymerized prior to application to glass. In a similar manner this class of resins may be employed in the lamination of wood, fabrics or other materials.

Resinous bodies can be cut to any desired form and then polished to provide a great variety of articles. The resins and scraps of the resin may be shredded or powdered and then molded under heat and pressure, or the comminuted material may be mixed with further polymerizable material which by appropriate treatment will be converted into hard bonding resins. Oil-soluble dyes, such as Rhodamin B, Victoria Green and pigments such as titanium dioxide may be incorporated into the resins prior to final solidification.

The new resins may be employed in the formation of optical lenses, jars, or lids for jars for cosmetics, drugs, foods and the like. They may be cast or cut to form an indefinite variety of handles, buttons, and objects of similar nature, or cast about specimens or objects of art to effect an embedment thereof. They may also be used for the formation of panels and coverings for electrical apparatus of a great variety.

Application of the principles of the invention is illustrated by the following example:

Example I

| | Grams |
|---|---|
| Maleic anhydride | 25 |
| Styrene | 35 |
| Methyl levulinate | 30 |

In the above example the mixture was preferably brought to a temperature sufficient to obtain mutual solution of the components. Polymerization was then effected by irradiation with actinic rays. The rate of polymerization was controlled by increase or decrease of the intensity of irradiation and/or the temperature. It can be brought to completion by irradiation with direct sunlight for a few minutes (15 or 20), followed by exposure to subdued light for some six hours. These exposures may take place at room temperature or slightly above, if so desired. The product may also be further hardened by heating.

But slight distortion takes place during polymerization. The resin is of exceptional clarity and is not subject to change of color upon aging. All of these qualities combine to provide a resin par excellence for embedding specimens, such as insects, flowers and biological specimens. An object, such as a beetle can be introduced into a solution of styrene and maleic acid or anhydride containing a plasticizer in a container of suitable size and shape and the reaction to form the solid resin effected, at temperatures sufficiently low to obviate damage to the specimen, merely by mild irradiation. There is no damage to the specimen, due to shrinkage and distortion of the medium during setting. The reaction is sufficiently rapid to be commercially feasible.

*Example II*

A sample of a solution from Example I was placed between two glass plates of soft glass and irradiated for one hour as described. The resin formed as a thin film between the plates which were not easily separated.

*Example III*

A portion of the solution of Example I was irradiated for five minutes until it had congealed to incipient gellation (the mass could still be poured). This enabled more of the material to be placed between the plates. During the second 15 minutes of irradiation, pressure was applied to the plates. The finished plates adhered well and shattered with difficulty.

*Example IV*

| | Grams |
|---|---|
| Maleic anhydride | 25 |
| Styrene | 30 |
| Isophorone | 30 |

*Example V*

| | Grams |
|---|---|
| Maleic anhydride | 25 |
| Camphor | 30 |
| Styrene | 33 |

*Example VI*

| | Grams |
|---|---|
| Maleic anhydride | 30 |
| Diacetone alcohol | 30 |
| Styrene | 30 |

*Example VII*

| | Grams |
|---|---|
| Styrene | 30 |
| Maleic anhydride | 20 |
| Mesityl oxide | 30 |

In the foregoing examples the dicarboxylic acids and their anhydrides are to be considered as equivalents, since each anhydride is derived from the acid merely by elimination of a mole of water and the ester is the same regardless of whether the acid or the anhydride is employed. Therefore, the term anhydride in the claims includes the acids and the term acid includes the anhydrides.

This is a division of my copending application Serial No. 407,010, filed August 15, 1941, now Patent No. 2,392,139 for Conjoint polymerization product of dicarboxylic compounds and vinylic compounds.

The application is also a companion of my application Serial No. 395,062, filed May 24, 1941, and entitled Plasticized styrene-maleic resin composition.

The embodiments of the invention herein described are merely exemplary and numerous modifications may be made therein without departure from the spirit of the invention or the scope of the appended claims.

What I claim is:

1. A method of preparing a hard, plasticized styrene-maleic anhydride body, which method comprises placing a mixture of about 25 parts of maleic anhydride and 30 parts of styrene together with about 30 parts of a plasticizer from the class consisting of methyl levulinate, acetophenone, diacetone alcohol and mesityl oxide in a mold of desired configuration and polymerizing the styrene and maleic anhydride to form the resin as a body containing the plasticizer imbibed therein.

2. A method of preparing a hard, plasticized styrene-maleic anhydride body, which method comprises placing a mixture of about 25 parts of maleic anhydride, 30 parts of styrene and 10 to 60% based upon the resin components of a plasticizer selected from the class consisting of methyl levulinate, acetophenone, diacetone alcohol and mesityl oxide in a mold of desired configuration and polymerizing the styrene and maleic anhydride to form the resin as a body containing the plasticizer imbibed therein.

HOWARD L. GERHART.

REFERENCES CITED

The following references are of record in the file of this patent:

UNITED STATES PATENTS

| Number | Name | Date |
|---|---|---|
| 2,321,897 | Britton et al. | June 15, 1943 |
| 2,047,398 | Voss et al. | July 14, 1936 |
| 2,252,091 | Muller et al. | Aug. 12, 1941 |
| 2,056,794 | Macht et al. | Oct. 6, 1936 |
| 2,188,903 | Kauppi et al. | Feb. 6, 1940 |
| 2,327,007 | Bent et al. | Aug. 17, 1943 |

FOREIGN PATENTS

| Number | Country | Date |
|---|---|---|
| 491,576 | Great Britain | 1938 |